US007222435B1

(12) United States Patent
Orfield et al.

(10) Patent No.: US 7,222,435 B1
(45) Date of Patent: May 29, 2007

(54) SELF MEASURING WORKPIECE

(76) Inventors: Adam Orfield, 28259 Springfield Dr., Meadowview, VA (US) 24361; Tony Orfield, 28292 Springfield, Meadowview, VA (US) 24361

( * ) Notice: Subject to any disclaimer, the term of this patent is extended or adjusted under 35 U.S.C. 154(b) by 235 days.

(21) Appl. No.: 10/918,961

(22) Filed: Aug. 16, 2004

(51) Int. Cl.
*G01B 3/30* (2006.01)

(52) U.S. Cl. .............................. 33/648; 33/649; 33/42; 33/429; 33/494; 52/519; 52/520; 52/543

(58) Field of Classification Search .................. 52/105, 52/519–522, 543–552; 33/1 B, 1 G, 494, 33/562, 563, 566, 679.1, 646, 647, 648, 649, 33/33, 41.1, 42, 429, 481, 1 BB
See application file for complete search history.

(56) References Cited

U.S. PATENT DOCUMENTS 2,375,427 A * 5/1945 Mannino ..................... 33/1 B
3,611,660 A * 10/1971 Costello ...................... 52/314
4,858,402 A * 8/1989 Putz ............................ 52/105
4,870,788 A * 10/1989 Hassan ......................... 52/105
4,924,644 A * 5/1990 Lewis .......................... 52/105
4,927,696 A * 5/1990 Berg ....................... 428/195.1
5,203,090 A * 4/1993 Bouska et al. ................ 33/481
5,842,280 A * 12/1998 Robell ......................... 33/1 B
5,924,213 A * 7/1999 Lee ............................. 33/494
6,049,987 A * 4/2000 Robell ......................... 33/1 B
6,115,926 A * 9/2000 Robell ......................... 33/1 B
6,269,595 B1 * 8/2001 Blubaugh et al. ............. 52/105
6,334,259 B1 * 1/2002 Harvey .......................... 33/42
6,494,014 B2 * 12/2002 Lafrance .................. 52/745.05
6,834,438 B1 * 12/2004 Heister ........................ 33/566
6,915,581 B2 * 7/2005 Harris ......................... 33/1 B
RE38,783 E * 8/2005 Harris .......................... 33/494
7,045,197 B2 * 5/2006 Harris ...................... 428/195.1

* cited by examiner

*Primary Examiner*—Jeanette Chapman

(57) ABSTRACT

An elongated construction workpiece having a viewable surface and adapted to be cut to a measured length or width at a work site, wherein the workpiece is provided on a viewable surface adjacent one or more of its edges with linear measure markings whereby a desired length or width of the workpiece can be cut utilizing only the markings thereon with no need for a tape measure or the like.

11 Claims, 1 Drawing Sheet

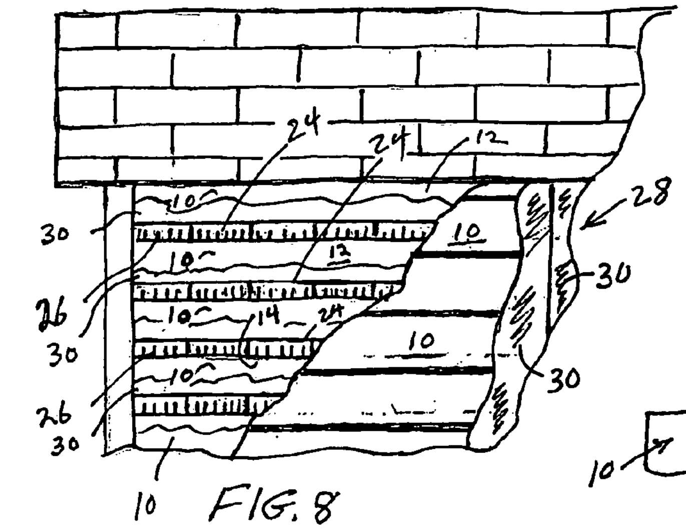
FIG. 8
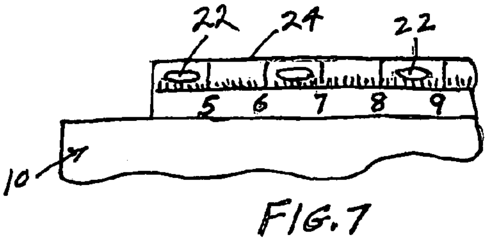
FIG. 7
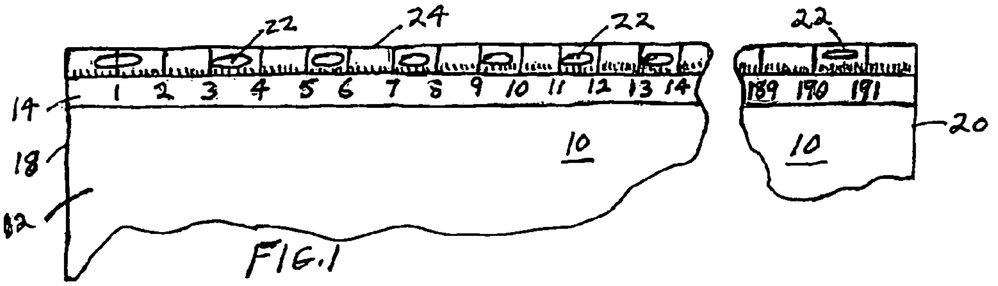
FIG. 1
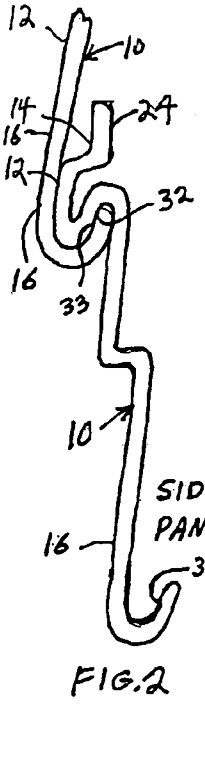
FIG. 2
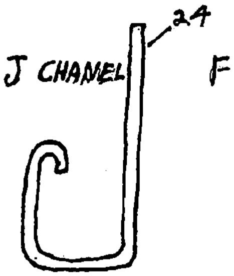
FIG. 3
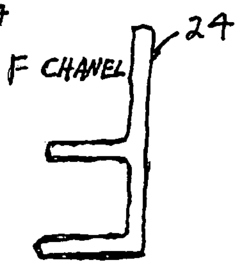
FIG. 4
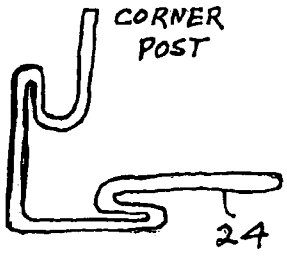
FIG. 5
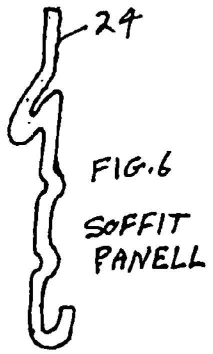
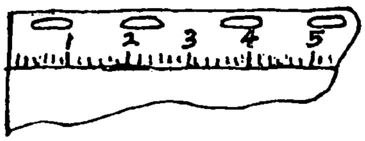
FIG. 9

SELF MEASURING WORKPIECE

BACKGROUND OF THE INVENTION

1. Field

This invention provides a novel and unique measurement system for application to a large variety of workpieces such as vinyl siding and components thereof including corner post, J-channel, F-channel, fascia, undersill and the like, soffit-panels, or manufactured wood or sheet metal or plastic products such as plywood sheets, plastic or metal guttering and roofing and the like.

2. Prior Art

Heretofore, cutting workpieces such as those mentioned above to size on the job has involved the time consuming steps of placing the workpiece, which typically is several, e.g., 10 to 20 feet in length, on a table or other flat support, taking up a tape measure and hooking the end thereof to an end of the workpiece, extending the tape measure out along the workpiece without dislodging the hook end thereof from the workpiece, marking on the workpiece the desired cut point, removing the tape measure from the workpiece, retracting the tape measuring, replacing the tape measure at its storage place, placing the workpiece in a position on the support to be cut on the mark, and cutting the workpiece.

The time involved in carrying out these steps does not, at first glance, appear as a significant time expenditure, however, for example, for a typical days vinyl siding work on a large home, the cutter operator will use a tape measure hundreds of times and easily expend an hour or so each day in just measuring and marking.

SUMMARY OF THE INVENTION

The present invention eliminates such wasteful time expenditure by providing a workpiece of any size or shape with its own ruler (linear dimension) markings, for example along one or more edges thereof such that the cutter operator need only to cut on the mark already on the workpiece as it is called out by the siding installer, e.g., “thirteen feet, one and one quarter inches”.

The invention an thus be summarized as an elongated construction workpiece having a viewable surface and adapted to be cut to a measured length or width at a work site, wherein said workpiece is provided on said viewable surface, preferably adjacent one or more of its edges with linear measure markings whereby a desired length or width of the workpiece can be cut accurately without the need for a tape measure or the like.

BRIEF DESCRIPTION OF THE DRAWINGS

The invention will be understood further from the drawings herein and description wherein structural portions are not drawn to scale and are enlarged for clarity, wherein:

FIG. 1 is a top surface view of a vinyl siding panel with the present linear measure markings in one inch increments (for purposes of clarity) provided along a portion of its longitudinal nailing flange;

FIG. 2 is an end view of the panel of FIG. 1 showing a portion of an upper overlapping panel which obscures the markings;

FIGS. 3, 4, 5 and 6 are end views of various shapes of vinyl siding or other construction components having an edge nailing flange which can be provided with the present linear measure markings;

FIG. 7 is a view as in FIG. 1 showing an inset left edge and linear dimension numbering.

FIG. 8 shows portions of a building structure with vinyl siding (enlarged for clarity) affixed thereto in accordance with the present invention with portions of the siding broken away for clarity; and FIG. 9 shows an alternate placement of the markings.

DETAILED DESCRIPTION

Referring to the drawings and with particular reference to the claims herein, shown is a typical vinyl siding panel 10 as it comes from the factory having the cross-section configuration shown enlarged for clarity in FIG. 2 and a viewable outer surface 12, an upper portion 14, a lower portion 16, a left end edge portion 18 and right end edge portion 20. Nailing apertures 22 are typically provided in a nailing flange 24 integral with portion 14.

The present linear measure markings generally designated 26 are marked on surface 12 by any means such as stamping, embossing, printing, stick-on tape measure, or the like in easily readable form such as the black ink printing on conventional tape measures, and are detailed as desired, e.g., starting at zero with any desired incremental distance markings such as 1/64", 1/32", 1/16", 1/8", or 1/4" increments, along the entire length of the workpiece such as a 150 inch long siding panel, from either left or right, or both.

As shown in FIG. 2, it is preferred that the markings be placed on a portion of the workpiece which will be covered over with portions of an adjacent workpiece during the siding installation, such as flange 24 being covered over by the lower portion 16 of an upper adjacent vinyl siding panel. It is noted that for siding panels wherein the nailing flanges does not extend all the way to the end edge, e.g. 18, of the panel, the linear dimension numbering can invisibly start at said edge but the viewable printing on the flange will pick up inwardly of said edge as shown in FIG. 7.

Further with reference to the claims, the present invention further comprises the combination of a building structure 28 having an exterior wall 30 of, e.g., plywood sheets, with vinyl siding panels 10 affixed thereto in a generally vertical successive manner, wherein each said panel has upper portion 14 with a longitudinally extending nailing flange 24, wherein linear dimension markings 26 are provided on said nailing flanges substantially the full lengths thereof, and wherein said panels are affixed to said wall by nailing said flanges thereto. As shown in FIG. 2, wherein said upper portion 14 of each said panel is provided with a longitudinally extending first shoulder 32, wherein a lower portion 16 of each said panel is provided with a longitudinal extending second shoulder 33, interlocked with the first shoulder of an adjacent panel and wherein the lower portion 16 of each successive upper panel overlies the nailing flange and markings of the adjacent lower panel.

The markings can, of course, be in any language, of any character style, of any color and placed on any visible, viewable portion of the workpiece, but along an edge thereof which will become covered over is usually the preferred location. An ink print roller would be a preferred way to apply the markings whereby during manufacture of the workpiece the print could be rapidly and automatically applied to the workpiece.

This invention has been described in detail with particular reference to preferred embodiments thereof, but it will be understood that variations and modifications will be effected within the spirit and scope of the invention.

We claim:

1. The combination of a building structure having an exterior wall with vinyl siding panels affixed thereto in a generally horizontal assembly and vertically successive manner to provide upper and lower adjacent panels, wherein each said panel has a longitudinally extending upper first edge portion including a nailing flange and adjacent panel portions, wherein linear dimension markings are provided on said first edge portion substantially the full length thereof, wherein said panels are affixed to said wall by nailing said flanges thereto, wherein an upper portion of each said panel is provided with a longitudinally extending first shoulder means, wherein a lower portion of each said panel is provided with a longitudinally extending second shoulder means, wherein said first and second shoulder means of adjacent panels are interlocked to prevent movement of the lower portion of each panel away from said wall, and wherein the lower portion of each successive upper panel overlies the first edge portion and markings of the adjacent lower panel.

2. A vinyl siding panel for use in the assembly of a combination of a building structure having an exterior wall with vinyl siding panels affixed thereto in a generally vertical successive manner to provide upper and lower adjacent panels, wherein each said panel has a longitudinally extending upper first edge portion including a nailing flange and adjacent panel portions, wherein linear dimension markings are provided on said first edge portion substantially the full length thereof, wherein each said panel is to be affixed to the exterior wall by nailing said flange thereto, wherein an upper portion of said panel is provided with a longitudinally extending first shoulder means, wherein a lower portion of said panel is provided with a longitudinally extending second shoulder means, whereby said first and second shoulder means of adjacent panels can be interlocked to prevent movement of the lower portion of each panel away from said exterior wall, and whereby the lower portion of each successive upper panel can overlie the first edge portion and markings of the adjacent lower panel.

3. The vinyl siding panel of claim 2 wherein said markings are in one or more increments selected from the group consisting of 1⁄64, 1⁄32, 1⁄8, or 1⁄4 of an inch.

4. The vinyl siding panel of claim 2 wherein said first edge portion includes said viewable surface and said nailing flange, and wherein said markings are on at least one of said nailing flange or an adjacent section of said first edge portion.

5. The panel of claim 2 wherein said markings are on said nailing flange and extend to adjacent the top edge of said panel.

6. The combination of a building structure having an exterior wall (30) with vinyl siding panels (10) affixed thereto in a generally vertical successive manner, wherein each said panel has a viewable outer surface (12) including an upper portion (14) with a longitudinally extending nailing flange (24) with nailing apertures (22), wherein linear dimension markings (26) are provided on said surface (12) substantially the full length thereof, said panel further having a lower portion (16), a leaf end edge portion (18), and a right end edge portion (20), said upper portion (14) of each said panel having a longitudinally extending first shoulder (32), a lower portion (16) of each said panel having a longitudinally extending second shoulder (33) interlocked with the first shoulder (32) of an adjacent panel, wherein the lower portion (16) of each successive upper panel overlies the nailing flange and markings of the adjacent lower panel.

7. A group of elongated pre-finished construction workpieces, each of which has an upper longitudinal edge portion providing a longitudinally marked initially viewable surface portion, each of workpieces having a second longitudinal edge portion, a first end and a lower end, wherein each said workpiece is provided on its initially viewable surface portion with highly visible linear measure markings whereby the workpiece can be cut by an installer to a desired length utilizing, for measuring, only said markings and without the need for any other measuring device, wherein said markings are in desired incremental distances, wherein each said workpiece is a finished vinyl siding panel, and wherein said initially viewable surface portion of each workpiece includes a nailing flange of said workpiece, and wherein the workpieces are affixed in typical assembly manner to a building wherein an upper vinyl siding workpiece is adjacent to a lower vinyl siding workpiece of the same construction and has its lower longitudinal edge portion overlying the upper longitudinal edge portion of said lower vinyl siding workpiece and obscuring the markings on said initially viewable surface portion of said lower vinyl siding workpiece.

8. The workpieces of claim 7 wherein wherein said markings are on said nailing flange and extend upwardly to adjacent the top edge of said workpiece.

9. The workpieces of claim 7 wherein said markings run progressively in opposite directions longitudinally of each workpiece.

10. The workpieces of claim 7 wherein each workpiece comprise a vinyl siding component member selected from the group consisting of corner posts, J-channels, F-channels, fascias and undersills.

11. The workpieces of claim 7 wherein said markings are in one or more linear increments selected from the group consisting of 1⁄64, 1⁄32, 1⁄8 or 1⁄4 inch.

* * * * *